(12) United States Patent
Hsu

(10) Patent No.: US 9,189,948 B2
(45) Date of Patent: Nov. 17, 2015

(54) OBJECT ACQUIRING SYSTEM AND ACQUIRING METHOD THEREOF

(71) Applicant: GLORY TRIPOD PROPERTY CORP., The Valley (AI)

(72) Inventor: Shih Jieh Hsu, Taichung (TW)

(73) Assignee: GLORY TRIPOD PROPERTY CORP., The Valley (AI)

( * ) Notice: Subject to any disclaimer, the term of this patent is extended or adjusted under 35 U.S.C. 154(b) by 0 days.

(21) Appl. No.: 14/332,989

(22) Filed: Jul. 16, 2014

(65) Prior Publication Data
US 2015/0022350 A1 Jan. 22, 2015

(30) Foreign Application Priority Data
Jul. 16, 2013 (TW) .............................. 102125471 A

(51) Int. Cl.
| | |
|---|---|
| *G08B 1/08* | (2006.01) |
| *G08B 21/24* | (2006.01) |
| *G01S 5/00* | (2006.01) |
| *G01S 5/02* | (2010.01) |
| *G08B 25/01* | (2006.01) |
| *H04W 4/02* | (2009.01) |

(52) U.S. Cl.
CPC .............. *G08B 21/24* (2013.01); *G01S 5/0027* (2013.01); *G01S 5/02* (2013.01); *G01S 5/0289* (2013.01); *G08B 25/016* (2013.01); *H04W 4/02* (2013.01)

(58) Field of Classification Search
CPC ................................. G08B 21/24; H04W 4/02
USPC ............... 340/539.32, 539.13, 539.22, 425.5, 340/601, 573.4; 455/404.2, 456.4
See application file for complete search history.

(56) References Cited

U.S. PATENT DOCUMENTS

| | | | |
|---|---|---|---|
| 7,403,098 B2 * | 7/2008 | Watkins et al. | 340/425.5 |
| 2007/0171047 A1 * | 7/2007 | Goodman et al. | 340/539.13 |
| 2009/0042534 A1 * | 2/2009 | Levanen | 455/404.2 |

* cited by examiner

*Primary Examiner* — Tai T Nguyen
(74) *Attorney, Agent, or Firm* — Chun-Ming Shih

(57) ABSTRACT

An object acquiring system includes a cloud center, a target device disposed on an object, a host device, and a plurality of acquiring and tracking devices. The target device is provided with an ID. The host device registers an object account database, according to the ID, in the cloud center, and records a state message for the target device in the object account database. When receiving the ID transmitted by the target device, the acquiring and tracking devices log in the cloud center to check the state message, and determine whether to report the geolocation, and/or the time the ID is received, to the cloud center. The geolocation and the time information, reported by the acquiring and tracking devices, are used to track the moving trace of the target device, so that the object can be quickly located when straying or getting lost.

18 Claims, 3 Drawing Sheets

OBJECT ACQUIRING SYSTEM AND ACQUIRING METHOD THEREOF

CROSS-REFERENCE TO RELATED APPLICATIONS

This non-provisional application claims priority claim under 35 U.S.C. §119(a) on Taiwan Patent Application No. 102125471 filed Jul. 16, 2013, the entire contents of which are hereby incorporated by reference.

BACKGROUND

1. Technical Field

The present disclosure relates to an object acquiring system and acquiring method, and more particularly, to an object acquiring system and acquiring method for monitoring an object and tracking the moving trace of the object.

2. Description of Related Art

Many people tend to carelessly place an object (e.g., a key) in any place, and later forget where the object was located when they want to use it. The time spent in acquiring the object often causes inconvenience in their daily life.

To easily locate or acquire an object, an object acquiring device with short-range communication protocol (e.g., Bluetooth) may be disposed on the object in advance, such that when a user sends a short-range wireless signal to the object acquiring device via an electronic device (e.g., a smartphone), the object acquiring device will respond to the signal, allowing the user to locate the object. However, once the object acquiring device is out of the communication range with the electronic device, the user will not be able to get access to, and control, the object acquiring device, thus making the object acquiring device unusable. Hence, such short-range based object acquiring device is just applicable to an object acquiring scenario in locating a fixed object.

It is common for a pet owner to carry a pet when he/she goes out for a walk or an outing. A pet, once being out, is prone to be intrigued by the outside environment, especially a spacious and open place (e.g., a park or roadway), and may act out in an unexpected way, a behavior that could cause the pet to escape from the pet owner's observation, so increasing the chance the pet strays or gets lost. Likewise, when a family member goes out with a child or an elderly person with dementia, it is likely that the child or the elderly person walks spontaneously and escapes from the family member's observation. Once straying or getting lost, the child or elderly person may not clearly describe themselves for assistance, thereby making object acquiring more difficult.

To prevent the object, such as a pet, a child, or an elderly person, from straying, a monitoring device equipped with a positioning (e.g., GPS) and long-range communication component (e.g., GSM) may be disposed on the object in advance. When the object strays or gets lost, the owner or the family member uses a smartphone to receive a location signal, transmitted by the monitoring device, indicating the location of the object. The monitoring device is configured to monitor the object's location in a long range; however, the installation cost of GPS and GSM is high, and related communication modules for GPS and GSM are power consuming. Hence, the battery of the monitoring device may quickly run out, causing the monitoring device to fail to keep monitoring on the object.

In view of the foregoing, the present disclosure provides an object acquiring system and acquiring method, which keeps monitoring on the object (e.g., a child, an elderly person, a pet, or a car) to lower the chance the object strays or gets lost, and quickly locates the object by tracking the moving trace of the object when the object strays or gets lost.

SUMMARY

An object of the present disclosure is to provide an object acquiring system and acquiring method, in which the object acquiring system includes a cloud center, a target device disposed on an object, a host device, and a plurality of acquiring and tracking devices with geolocation acquiring. The target device is provided with an ID. The host device registers an object account database, according to the ID of the target device, in the cloud center, and sets up a state message for the target device in the object account database. When the target device establishes a communication with the respective short-range communication modules of the acquiring and tracking devices, the acquiring and tracking devices receive the ID transmitted by the target device. Each of the acquiring and tracking devices receiving the ID of the target device logs in the cloud center to check the state message associated with the target device, and determines, based on the state message of the target device, whether to report the geolocation, and/or the time the ID is received, to the cloud center. The user of the host device checks the information reported by the acquiring and tracking devices to track the moving trace of the target device, so as to quickly locate the object when the object strays or gets lost.

Another object of this disclosure is to provide an object acquiring system and acquiring method, in which the target device is disposed on a moving object. When the target device is moving away from the host device and out of the communication range with the host device, such that the target device fails to transmit the ID to the host device, an alarm, embedded in the target device, is configured to alert the user monitoring the object, or the people surrounding the object, to pay immediate attention, and thus lower the chance the object strays or gets lost.

Another object of this disclosure is to provide an object acquiring system and acquiring method, in which the target device is disposed on a moving object. When receiving the ID transmitted by the target device, each of the acquiring and tracking devices receiving the ID reports the geolocation and the time the ID is received to the cloud center, so as to monitor and track the whereabouts of the object at all times, and thus lower the chance the object strays or gets lost.

Another object of this disclosure is to provide an object acquiring system and acquiring method, in which the target device is disposed on an object prohibited to move. The owner of the object operates the host device and sets up an alert state message for the object, and records the position the object is located as an alert location, in the object account database of the cloud center. Later, when the current geolocation is detected to be not consistent with the alert location recorded in the object account database, the acquiring and tracking devices report the current geolocation and the time the ID is received to the cloud center for tracking and monitoring the object, which otherwise should be fixed or limited in movement.

Another object of this disclosure is to provide an object acquiring system and acquiring method, in which the host device records a contact message associated with the object in the object account database of the cloud center. Later, when the acquiring and tracking devices determine that, based on the received ID of the target device, the object strays or gets lost, the contact message is used to inform the owner or management personnel of the object.

Another object of this disclosure is to provide an object acquiring system and acquiring method, in which a low-power communication annunciator of the target device is configured to establish a communication with the host device or the acquiring and tracking devices, in order to reduce power consumption, and thus avoid power to be run out quickly that could cause the target device to fail to operate when the object strays or gets lost.

To this end, this disclosure provides an object acquiring system which includes a cloud center, a target device, a host device, and a plurality of acquiring and tracking devices. The target device is provided with an ID and includes a controller and a low-power communication annunciator, where the controller is electrically connected to the low-power communication annunciator and transmits the ID via the low-power communication annunciator. The host device includes a first monitoring module, a first low-power communication module, and a first network communication module, where the first monitoring module is electrically connected to the first low-power communication module and the first network communication module. The host device communicates with the cloud center via the first network communication module. The first monitoring module of the host device registers an object account database, according to the ID of the target device, in the cloud center, and records a state message for the target device in the object account database. Each of the acquiring and tracking devices includes a second monitoring module, a second low-power communication module, and a second network communication module, and is configured to position the current location to generate a geolocation. The second monitoring module is electrically connected to the second low-power communication module and the second network communication module. Each of the acquiring and tracking devices communicates with the cloud center via the second network communication module. The target device establishes a communication with the first low-power communication module of the host device or the respective second low-power communication modules of the acquiring and tracking devices via the low-power communication annunciator. When the low-power communication annunciator of the target device establishes a communication with the second low-power communication module of a acquiring and tracking device, the acquiring and tracking device receives the ID transmitted by the target device, and the second monitoring module of the acquiring and tracking device logs in the object account database of the cloud center to check the state message associated with the target device. The acquiring and tracking device determines, based on the state message, whether to report the geolocation, and/or the time the ID is received, to the cloud center.

In one embodiment, when the low-power communication annunciator of the target device establishes a communication with the first low-power communication module of the host device, the host device receives the ID transmitted by the target device, and the first monitoring module of the host device is configured to monitor the target device after locking in the ID of the target device.

In one embodiment, the first monitoring module of the host device sets up an alert state message for the target device, and records the position that the object should be located as an alert location, in the object account database of the cloud center. Later, when one of the acquiring and tracking devices receives the ID transmitted by the target device, the second monitoring module of the acquiring and tracking device responds to log in the object account database of the cloud center and check that the state message of the target device is in an alert state. The second monitoring module of the acquiring and tracking device then compares the geolocation with the alert location recorded in the object account database, and if they are not consistent, reports the geolocation to the cloud center.

In one embodiment, the first monitoring module of the host device sets up a monitoring, stray, or lost state message for the target device in the object account database of the cloud center. Later, when one of the acquiring and tracking devices receives the ID transmitted by the target device, the second monitoring module of the acquiring and tracking device responds to log in the object account database of the cloud center and check that the target device is in a monitoring, stray, or lost state. The second monitoring module of the acquiring and tracking device then voluntarily responds to report the geolocation to the cloud center.

In one embodiment, the first monitoring module of the host device records a contact message associated with the target device in the object account database of the cloud center. Later, when the target device gets lost or strays, the second monitoring module of the acquiring and tracking device receiving the ID logs in the object account database of the cloud center to check the contact message for contact information.

In one embodiment, each of the acquiring and tracking devices further includes a geo-aware module, where each geo-aware module is electrically connected to the respective second monitoring modules and configured to position to generate a geolocation.

In one embodiment, the geo-aware module is a GPS locator.

In one embodiment, the acquiring and tracking device is installed in a fixed location, and the geographical coordinates of the fixed location are positioned as the geolocation.

In one embodiment, the first monitoring module and the second monitoring module are an APP.

In one embodiment, the low-power communication annunciator, the first low-power communication module, and the second low-power communication module are a short-range communication module compliant with a Bluetooth or ZigBee communication protocol.

In one embodiment, the first network communication module and the second network communication are a long-range communication module compliant with a 3G/4G or WiFi communication protocol.

In one embodiment, the target device may be manufactured in a form of collar, bracelet, watch, badge, or ornament.

This disclosure further provides an object acquiring method applied to an object acquiring system, where the object acquiring system includes a cloud center, a target device provided with an ID, a host device, and a plurality of acquiring and tracking devices with geolocation acquiring, and the host device and each acquiring and tracking device communicate with the cloud center via the respective long-range communication modules, and the target device establishes a communication with the host device, or the acquiring and tracking devices, via a short-range, low-power communication module. The object acquiring method includes the steps of: registering an object account database, according to the ID of the target device, in the cloud center; setting up a state message for the target device in the object account database of the cloud center; transmitting the ID to the host device or the acquiring and tracking devices; if one of the acquiring and tracking devices receives the ID transmitted by the target device, logging in, according to the ID, the object account database of the cloud center to check the state message associated with the target device; and determining, based on the state message, whether to report the geolocation, and/or the time the ID is received, to the cloud center.

In one embodiment, the step of transmitting the ID to the host device or the acquiring and tracking devices further includes: searching for the host device in the neighboring area; if the host device is found, transmitting the ID to the host device; and if the host device is not found, searching for one of the acquiring and tracking devices and transmitting the ID to the acquiring and tracking device being found.

In one embodiment, the host device sets up the state message for the target device as an alert state, and also records an alert location of the target device, in the object account database of the cloud center.

In one embodiment, the object acquiring method further includes the steps, to be performed by any of the acquiring and tracking devices receiving the ID from the target device, of: logging in the object account database of the cloud center to check the alert state message and the alert location; comparing the geolocation with the alert location; and reporting the geolocation to the cloud center if the geolocation and the alert location are not consistent.

In one embodiment, if the state message of the target device is set as a state of monitoring, stray, or lost, the object acquiring method include the steps, to be performed by any of the acquiring and tracking devices receiving the ID from the target device, of: logging in, according to the ID, the object account database of the cloud center to check the state message associated with the target device; and voluntarily reporting the geolocation to the cloud center.

In one embodiment, the host device records a contact message in the object account database of the cloud center, and when the object gets lost or strays, the acquiring and tracking device receiving the ID logs in the cloud center to check the contact message for contact information.

BRIEF DESCRIPTION OF THE DRAWINGS

The structure as well as a preferred mode of use, further objects, and advantages of this disclosure will be best understood by referring to the following detailed description of some illustrative embodiments in conjunction with the accompanying drawings, in which.

DETAILED DESCRIPTION OF THE PREFERRED EMBODIMENTS

Figure 1:
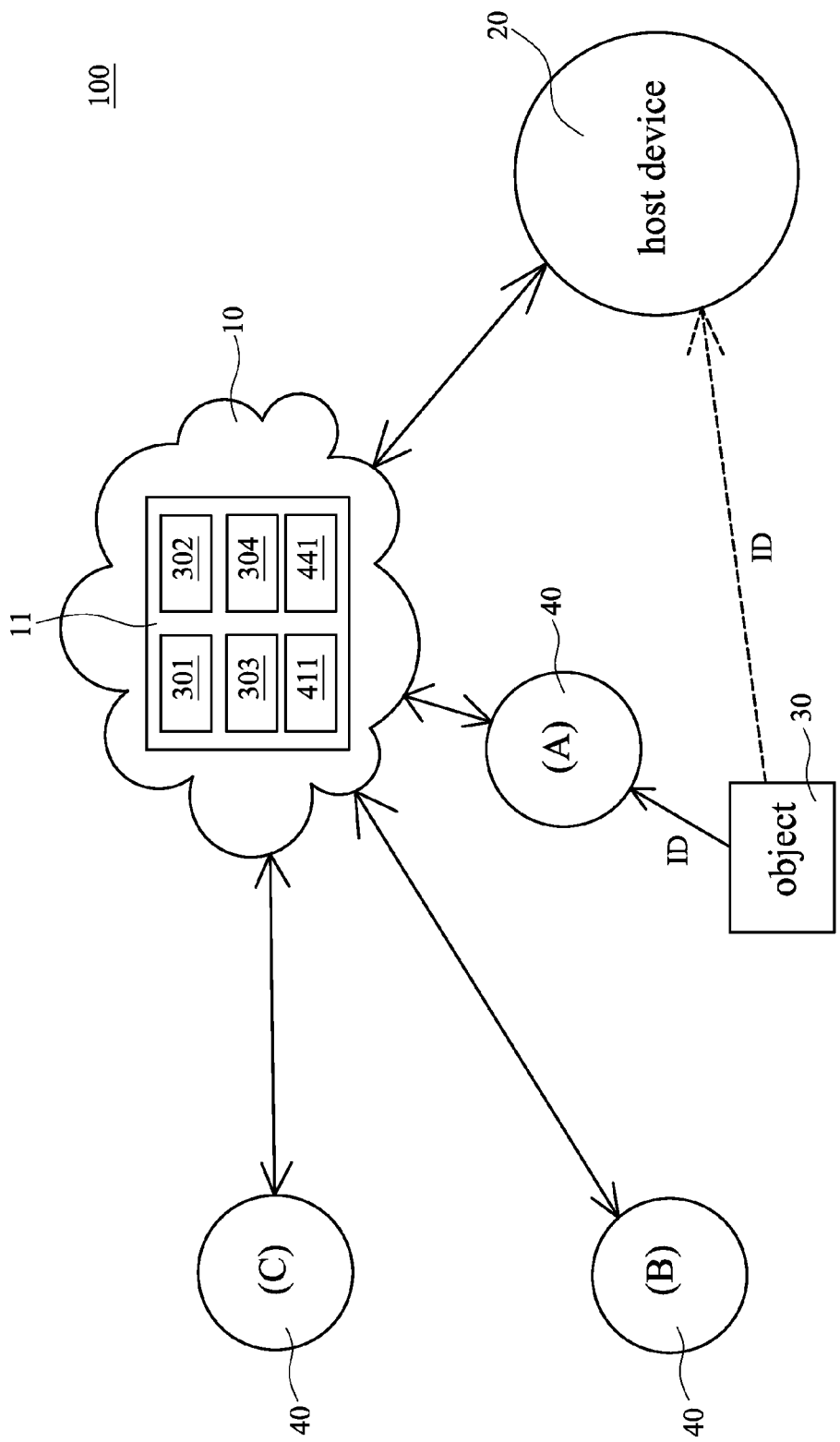
FIG. 1 is a system diagram of an illustrative object acquiring system according to a preferred embodiment of the disclosure.
Figure 2:
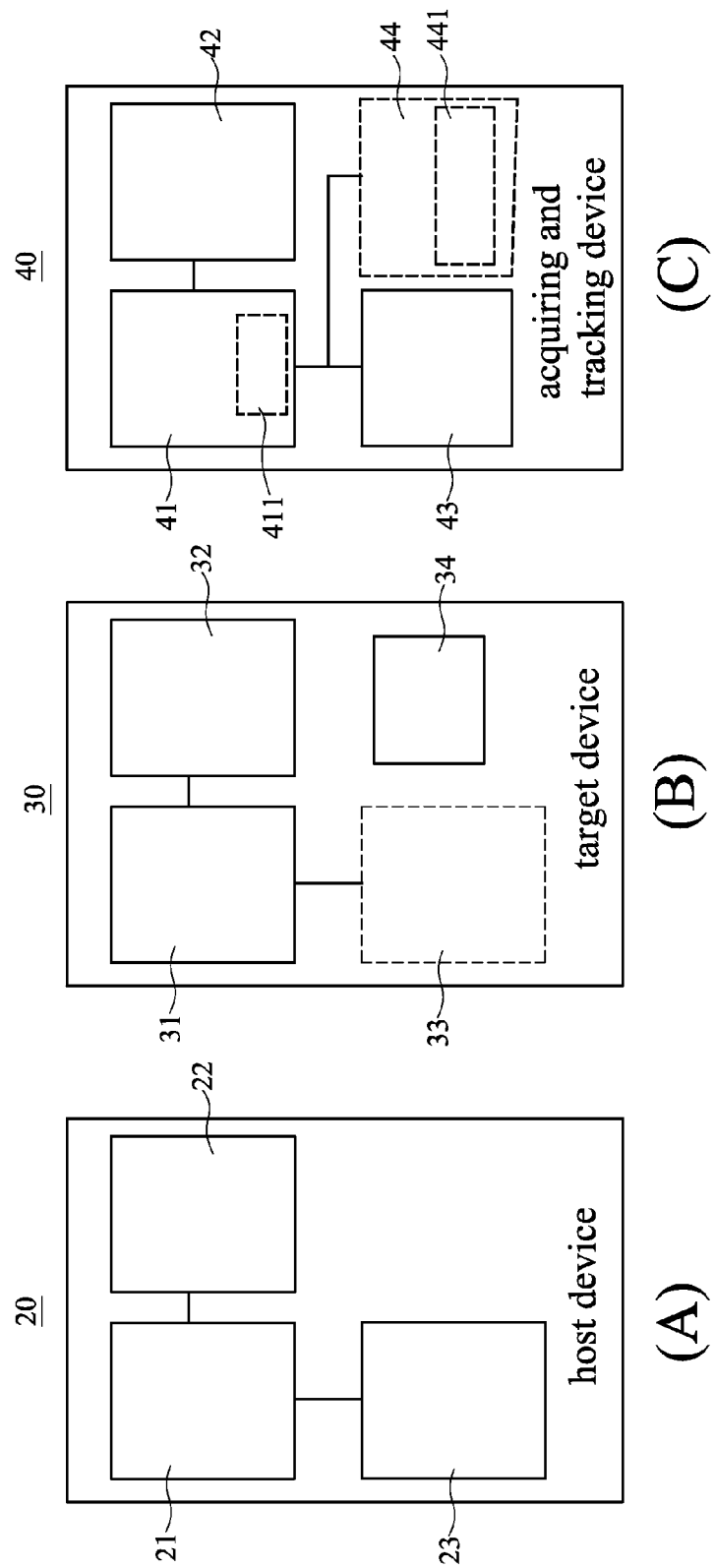
FIGS. 2A-2C are the block diagrams of a host device, a target device, and a acquiring and tracking device of the disclosure, respectively.

Referring to FIG. 1, with reference to FIGS. 2A-2C, the object acquiring system 100 includes a cloud center 10, a host device 20, a target device 30, and a plurality of acquiring and tracking devices 40 such as A, B, and C.

The target device 30 may be disposed on the object being monitored and tracked. The object may be a person or an object which, for example, includes a child, an elderly person, a pet, or a car. The target device 30 may be manufactured in a form of a collar, bracelet, watch, badge, or ornament, and worn on the object. The target device 30 includes a controller 31 and a low-power communication annunciator 32, in which the controller 31 is electrically connected to the low-power communication annunciator 32. Moreover, the target device 30 is provided with an ID 34, which is the unique identifier of the target device 30.

The host device 20 may be carried by the family, owner, or monitor of the object, and may be an electronic device which, for example, is a smartphone, PDA, tablet PC, laptop PC, or desktop PC. The host device 20 includes a first monitoring module 21, a first low-power communication module 22, and a first network communication module 23, where the first monitoring module 21 is electrically connected to the first low-power communication module 22 and the first network communication module 23. In this disclosure, the first monitoring module 21 is an APP (application software) installed in the host device 20. The user of the host device 20 sets up the ID 34 of the target device 30 in the first monitoring module 21 so that the first monitoring module 21 is configured to monitor the target device 30 after locking in the ID 34 of the target device 30.

The acquiring and tracking devices 40 are, like the host device, an electronic device, and may be carried by any third parties or other monitors. Each of the acquiring and tracking devices 40 includes a second monitoring module 41, a second low-power communication module 42, and a second network communication module 43, where the second monitoring module 41 is electrically connected to the second low-power communication module 42 and the second network communication module 43. The second monitoring module 41 is, like the first monitoring module 21, an APP installed in each of the acquiring and tracking devices 40.

Moreover, each of the acquiring and tracking devices 40 is configured to position its current location to generate a geolocation 441. In one embodiment, the geolocation 441 is generated by a geo-aware module 44 electrically connected to the second monitoring module 41. The geo-aware module 44 may be a GPS locator. In another embodiment, if one of the acquiring and tracking devices 40 is installed at a fixed location, the fixed location is positioned to be the geolocation 441.

The host device 20 and the acquiring and tracking devices 40 communicate with the cloud center 10 via the first network communication module 23 and the respective second network communication modules 43. In this disclosure, the first network communication module 23 and the second network communication modules 43 are a long-range communication module compliant with a 3G/4G or WiFi communication protocol. The target device 30 establishes, via the low-power communication annunciator 32, a communication with the first low-power communication module 22 of the host device 20 or the respective second low-power communication modules 42 of the acquiring and tracking devices 40, in order to transmit the ID 34 to the host device 20 or the acquiring and tracking devices 40. Moreover, the first low-power communication module 22, the low-power communication annunciator 32, and the second low-power communication module 42 are a short-range communication module compliant with a Bluetooth or ZigBee communication protocol.

Figure 3:
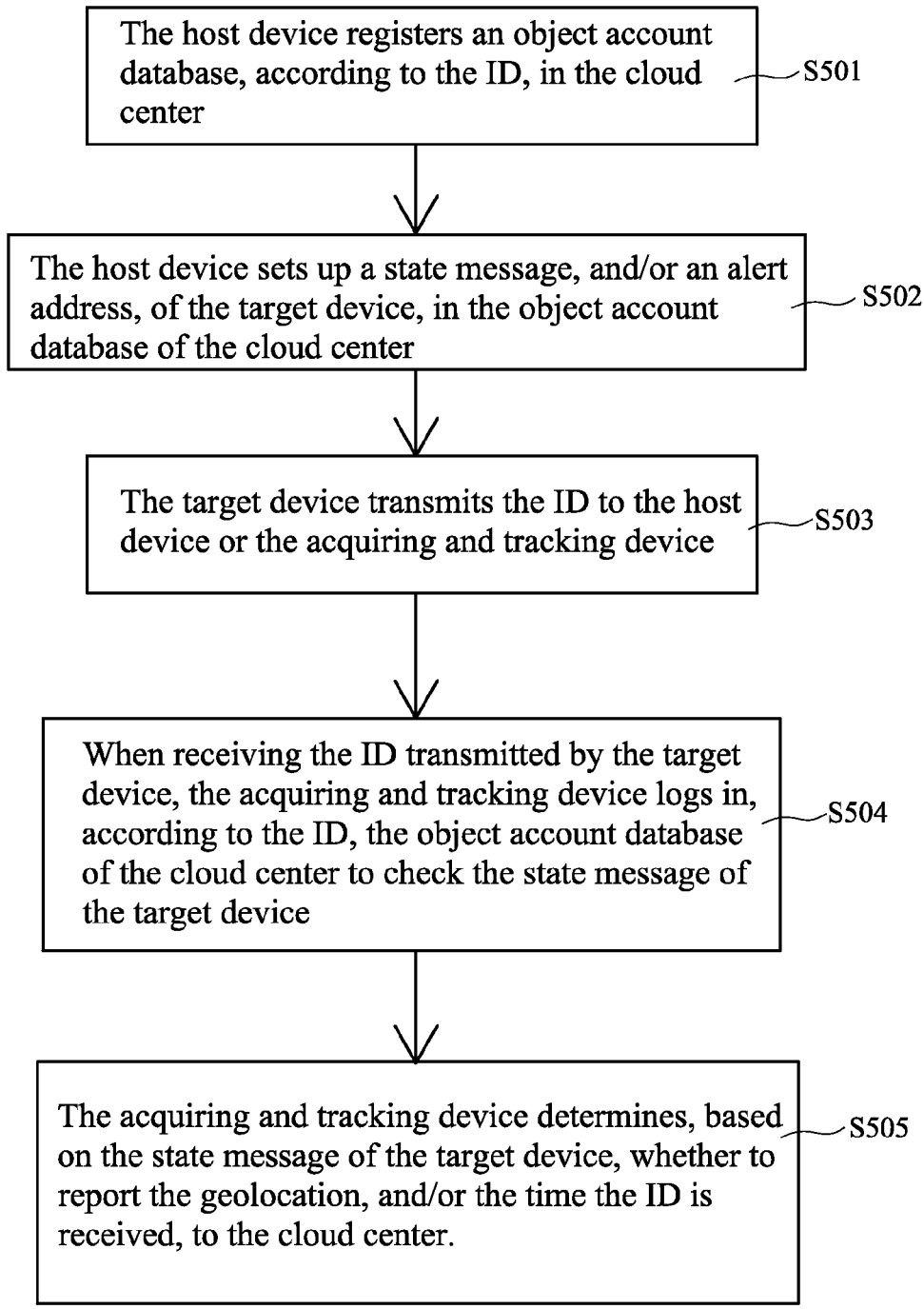
FIG. 3 is a flowchart of an object acquiring method according to a preferred embodiment of the disclosure.

With further reference to FIG. 3 on the flowchart of the object acquiring method, the steps for the acquiring method are described as follows. Before the object acquiring system 100 operates, the first monitoring module 21 of the host device 20 registers in advance an object account database 11, according to the ID 34 of the target device 30, in the cloud center 10, as indicated in step S501. Next, the user of the host device 20 sets up, according to practical scenarios and current state of the target device 30, a state message 301 for the target device 30 via the first monitoring module 21, as indicated in step S502.

In step S503, the object acquiring system 100 starts to operate. The controller 31 of the target device 30 first searches for the host device 20, installed with the first monitoring module 21, via the low-power communication annunciator 32. If the host device 20 is located within the communication range of the low-power communication annunciator 32, the controller 31 of the target device 30 will detect the host device 20. After the target device 30 detects the host device 20, the low-power communication annunciator 32 of the target device 30 establishes a communication with the low-power communication module 22 of the host device 20 and transmits the ID 34 to the host device 20. If the host device 20 is out of the communication range of the low-power communication annunciator 32, and thus the controller 31 of the host device 30 fails to detect the host device 20, the target device 30 further searches the neighboring area if at least one acquiring and tracking device 40, which is installed with the second monitoring module 41, exists. If one of the acquiring and tracking devices 40, for example, A, is detected, the target device 30 establishes a communication with the second low-power communication module 32 of the acquiring and tracking device 40 via the low-power communication annunciator 32, and transmits the ID 34 to the acquiring and tracking device 40.

In step S504, when the acquiring and tracking device 40 receives the ID 34 transmitted by the target device 30, the second monitoring module 41 of the acquiring and tracking device 40 logs in, according to the ID 34, the object account database 11 of the cloud center 10 to check the state message 301 associated with the target device 30.

Next, in step S505, the second monitoring module 41 of the acquiring and tracking device 40 determines, based on the state message 301 of the target device 30, whether to report the geolocation 441, and/or the time 441 the ID 34 is received, to the cloud center 10. The geolocation 441 and/or the time 441 the ID 34 will be recorded in the object account database 11 of the cloud center 10, where the geolocation 441 and the time 411 the ID 34 is received that the acquiring and tracking device 40 reports to the cloud center 10 are the location of the acquiring and tracking device 40 and the time when detecting the target device 20, respectively.

The object acquiring method allows the target device 30 to be monitored and tracked by the acquiring and tracking devices 40 located nearby, even when the target device 30 is moving away from the host device 20. Later, the family, the host, or the monitor of the host device 20 can access the moving trace of the target device 30 by checking the geolocation 441 and the time 411, reported by the acquiring and tracking devices, in the cloud center, so as to quickly locate the whereabouts of the object when the object strays or gets lost.

With continued reference to FIG. 3, multiple embodiments of the present disclosure based on various object acquiring scenarios are described as follows.

The first embodiment of this disclosure is based on an object acquiring scenario for a pet. When a pet owner goes out with a pet, the pet owner wears a target device 30, formed in a collar, on the pet. The pet owner carries a host device 20, and a acquiring and tracking device 40 is carried by any third party. In steps S501 and S502, the pet owner operates the first monitoring module 21 of the host device 20 to register an object account database 11, according to the ID 34 of the target device 30, in the cloud center, and set up the state message 301 of the target device 30 as a normal state in the object account database 11.

In step S503, as long as the target device 30 is kept in the area surrounding the host device 20, the target device 30 transmits the ID 34 to the host device 20. The first monitoring module 21 of the host device 20, after receiving the ID 34 of the target device 30, will stay in an idle state and take no operation. If the target device 30 is moving away from the host device 20 and when the low-power communication annunciator 32 of the target device 30 is out of the communication range with the host device 20, such that the target device 30 fails to transmit the ID 34 to the host device 20, the target device 30 will search for the acquiring and tracking device 40 in the surrounding area, and transmit the ID 34 to the acquiring and tracking device 40 being found.

If the ID 34, transmitted by the target device 30, is not received by the host device 20 after a predetermined period, the first monitoring module 21 will signal the host device 20 and make a sound and/or vibration to call the owner's attention that the pet may be out of the communication range the host device 20 can monitor. The owner of the host device 20 then checks whether the pet with the target device 30 is out of the range of observation. If the pet is out of the range of observation, the first monitoring module 21 of the host device 20 logs in the object account database 11 of the cloud center 10 and sets up the state message 301 of the target device 30 as an object acquiring state.

In step S504, when one of the acquiring and tracking devices 40 receives the ID 34 transmitted by the target device 30, the acquiring and tracking device 40 logs in, according to the ID 34 of the target device 30, the object account database 11 of the cloud center 10 to check the state message 301 of the target device 30.

In step S505, if the state message 301 of the target device 30 is in a normal state, the acquiring and tracking device 40 takes no further operation; if the state message 301 of the target device 30 is in an object acquiring state, the acquiring and tracking device 40 reports the geolocation 441, and/or the time 411 the ID 34 is received, to the cloud center 10. Later, the pet owner can get access to the moving trace of the pet by checking the geolocation 441 and the time 411, reported by the acquiring and tracking device 40, in the cloud center 10, and quickly locates the pet when the pet strays or gets lost.

In this embodiment, the target device 30 further includes an alarm 33 electrically connected to the controller 31, where the alarm 33 is a light-emitting or sounding component. When the target device 30 fails to transmit the ID 34 to the host device 20 due to lost communication connection, the controller 31 drives the alarm 33 to generate an alert signal to call the attention of the owner, or people around the target device 30, to the target device 30, so as to lower the chance the pet strays or gets lost.

The second embodiment of this disclosure is based on an object acquiring scenario for a child or elderly person. When a child or elderly person goes out alone, the family member wears a target device 30, formed in a bracelet, watch, or badge, on the child or the elderly person. The family member carries a host device 20, and a acquiring and tracking device 40 is carried by any third party. In steps S501 and S502, the family member operates the first monitoring module 21 of the host device 20 to register an object account database 11, according to the ID 34 of the target device 30, in the cloud center, and sets up the state message 301 of the target device 30 as a monitoring state in the object account database 11.

In step S503, after the child or the elderly person leave home alone, the target device 30 will start to search for the acquiring and tracking devices 40 in the neighboring area, and transmit the ID 34 to the acquiring and tracking device 40 begin found.

In step S504, after receiving the ID 34 transmitted by the target device 30, the acquiring and tracking device 40 logs in, according to the ID 34 of the target device 30, the object account database 11 of the cloud center 10 to check the state message 301 of the target device 30.

In step S505, after checking that the target device 30 is in a monitoring state, the acquiring and tracking device 40 voluntarily reports the geolocation 441, and/or the time the ID 34 is received, to the cloud center 10. Later, if the child or the elderly person does not get back home after a specified time and could not be contacted, the family member can track the moving trace of the child or the elderly person, by checking the geolocation 441, and/or the time the ID is received, which are reported by the acquiring and tracking device 40, in the cloud center 10, so as to quickly locate the child or the elderly person.

Moreover, other than tracking the moving trace of the child or the elderly person, the family member can set up the state message 301 of the target device as an object acquiring state in the cloud center via the host device 20. Later, when the acquiring and tracking device 40 receives the ID 34 transmitted by the target device 30, the user of the acquiring and tracking device 40 can report the location of the object to related personnel, for example, the police, who can assist in acquiring the child or the elderly person.

The third embodiment of this disclosure is based on an object acquiring scenario in an amusement park. Before a visitor enters the park, a staff member of the park wears a target device 30, formed in a bracelet, on the visitor. The staff member carries the host device 20, and each acquiring and tracking device 40 can be carried by another staff member or installed in a fixed location in the park. In steps S501 and S502, the staff member operates the first monitoring module 21 of the host device 20 to register, according to the ID 34 of the target device 30, an object account database 11 in the cloud center 10, and sets up the state message 301 of the target device 30 as a monitoring state.

In step S503, after the visitor enters the park, the target device 30 on the visitor will start to search for the acquiring and tracking devices 40 in the neighboring area, and transmits the ID 34 to the acquiring and tracking device 40 being found.

In step S504, after receiving the ID 34 transmitted by the target device 30, the acquiring and tracking device 40 logs in, according to the ID 34 of the target device 30, the object account database 11 of the cloud center 10 to check the state message 301 of the target device 30.

In step S505, after checking that the target device 30 is in a monitoring state, the acquiring and tracking device 40 voluntarily reports the geolocation 441, and/or the time the ID 34 is received, to the cloud center 10. Later, when the visitor asks the staff member to assist in searching for his/her family member or friend, the staff member operates the host device 20 to log in the cloud center to track the moving trace of the family member or friend, so as to quickly locate the family member or friend in the park.

The fourth embodiment of this disclosure is based on a theft-prevention scenario for a car (or any other fixed object). The car owner installs the target device 30, formed in an ornament or fixed object, on the car to be monitored. The car owner carries the host device 20, and each acquiring and tracking device 40 is carried by any third party or policeman, or installed at a fixed location, for example, a shop, gas station, government office, or base station. In step S501, the car owner operates the first monitoring module 21 of the host device 20 to register, according to the ID 34 of the target device 30, an object account database 11 in the cloud center 10. In step S502, the car owner operates the first monitoring module 21 of the host device 20 to set up the state message 301 of the target device 30 as an alert state and record the alert location for the car, which may be, for example, the location the car is parked.

In step S503, the target device 30 searches for the acquiring and tracking devices 40 in the neighboring area, and transmits the ID 34 to the acquiring and tracking device 40 begin found.

In step S504, after receiving the ID 34 transmitted by the target device 30, the acquiring and tracking device 40 logs in, according to the ID 34 of the target device 30, the object account database 11 of the cloud center 10 to check the state message 301 of the target device 30. If the state message 301 of the target device 30 is in an alert state, the acquiring and tracking device 40 further checks the alert location 302 of the target device 30.

In step S505, if the state message 301 of the target device 30 is in an alert state, the acquiring and tracking device 40 further compares the geolocation 441 with the alert location 302 stored in the object account database 11. If the acquiring and tracking device 40 checks that the geolocation 441 and the alert location 302 are consistent, it means that the car is still parked in the original location, and thus the acquiring and tracking device 40 takes no further operation; if the acquiring and tracking device 40 checks that the geolocation 441 and the alert location 302 are not consistent, meaning that the car has been moved, then the acquiring and tracking device 40 reports the geolocation 441, and/or the time the ID 34 is received, to the cloud center 10.

In this embodiment, with the geolocation 441, and/or the time 411 the ID 34 is received, reported by the acquiring and tracking device 40, the cloud center 10 is aware of the moving trace of the car, so that the cloud center 10 can inform the car owner with text message or by phone that the car may be at a risk of being stolen. If the car is stolen, the car owner logs in the cloud center 10 via the host device 20 and sets up the state message of the target device 30 as a lost state. Besides, the car owner can track the moving trace of the car by checking the geolocation 441, and/or the time 411 the ID 34 is received, in the cloud center 10, and report the information to the police for object acquiring, so as to quickly locate the car.

The foregoing embodiments of the disclosure are illustrative only, and the present disclosure is by no means limited to these embodiments. A person skilled in the art may apply this disclosure to other object acquiring and monitoring/tracking in the locating of people or objects.

In one embodiment, when the state message 301 of the target device 30 is set up as an object acquiring state, the first monitoring module 21 of the host device 20 can further record a trait message 303 (e.g., a pet, child, elderly person, or car) or a contact message 304 (e.g., phone or email) in the object account database 11 of the cloud center 10. The second monitoring module 41 of the acquiring and tracking device 40, after receiving the ID 34 of the target device 30, can identify the object with the trait message 303 in object acquiring, and once the object is recognized, contact the family member or the owner of the object with the contact message 304, so as to quickly locate the object being lost.

In this disclosure, the low-power communication annunciator 32 of the target device 30 is configured to establish a communication with the host device 20 or the acquiring and tracking devices 40, in order to reduce power consumption, and thus avoid power to run out quickly that the target device 30 fails to operate when the object strays or gets lost.

The moving trace of the object is monitored and tracked by the multiple geolocations 441 and times 411 associated with the target device 30, reported by the acquiring and tracking devices 40 installed in different locations. Other than reporting the geolocation 441 and the time 411 to the cloud center 10, the acquiring and tracking devices 40 are configured to identify the object with the trait message 303, and once the object is recognized, voluntarily contact the family member or the owner of the object with the contact message 304, so as for the family member or the owner of the object to quickly locate and acquire the object.

What is claimed is:

1. An object acquiring system, comprising:
   a cloud center including an object account database;
   a target device, provided with an ID, including a controller and a low-power communication annunciator, said controller being electrically connected to said low-power communication annunciator and transmitting said ID via said low-power communication annunciator;
   a host device, including a first monitoring module, a first low-power communication module, and a first network communication module, said first monitoring module being electrically connected to said first low-power communication module and said first network communication module, said host device communicating with said cloud center via said first network communication module, wherein said first monitoring module of said host device is configured to register said object account database, according to said ID of said target device, and to set up a state message for said target device in said object account database; and
   a plurality of acquiring and tracking devices, each including a second monitoring module, a second low-power communication module, and a second network communication module, said second monitoring module being electrically connected to said second low-power communication module and said second network communication module, a geolocation being generated by positioning said second monitoring module, each said acquiring and tracking device communicating with said cloud center via said second network communication module, wherein via said low-power communication annunciator, said target device establishes a communication with said first low-power communication module of said host device or said respective second low-power communication modules of said acquiring and tracking devices; wherein when said low-power communication annunciator of said target device establishes a communication with said second low-power communication module of one of said acquiring and tracking devices, said acquiring and tracking device receives said ID transmitted by said target device, and said second monitoring module of said acquiring and tracking device is configured to log in said object account database of said cloud center, and determine, based on said state message of said target device, whether to report said geolocation and a time said ID is received, to said cloud center.

2. The object acquiring system as of claim 1, wherein when said low-power communication annunciator of said target device establishes a communication with said first low-power communication module of said host device, said host device receives said ID transmitted by said target device, and said first monitoring module of said host device is configured to monitor said target device after locking in said ID of said target device.

3. The object acquiring system as of claim 1, wherein if said first monitoring module of said host device sets up said state message of said target device as an alert state, said first monitoring module also records the location of said target device as an alert location in said object account database of said cloud center, and when one of said acquiring and tracking devices receives said ID transmitted by said target device, said second monitoring module of said acquiring and tracking device logs in, according to said ID of said target device, said object account database of said cloud center and checks that said state message of said target device is in alert state, and said second monitoring module compares said geolocation with said alert location, and if said geolocation and said alert location are not consistent, said second monitoring module reports said geolocation, and/or the time said ID is received, to said cloud center.

4. The object acquiring system as of claim 1, wherein if said first monitoring module of said host device sets up said state message of said target device as a monitoring state or acquiring state, and when one of said acquiring and tracking devices receives said ID transmitted by said target device, said second monitoring module of said acquiring and tracking device logs in, according to said ID of said target device, said object account database of said cloud center and checks that said state message of said target device is in monitoring or acquiring state, and said second monitoring module of said acquiring and tracking device voluntarily reports said geolocation, and/or the time said ID is received, to said cloud center.

5. The object acquiring system as of claim 4, wherein said first monitoring module of said host device records a contact message in said object account database of said cloud center, and when the target device is in acquiring state, said second monitoring module of said acquiring and tracking device receiving said ID logs in said object account database of said cloud center to check said contact message for contact information.

6. The object acquiring system as of claim 1, wherein each said acquiring and tracking device further includes a geo-aware module electrically connected to said second monitoring module and configured to position to generate said geolocation.

7. The object acquiring system as of claim 6, wherein said geo-aware module is a GPS locator.

8. The object acquiring system as of claim 1, wherein each said acquiring and tracking device is fixed at a fixed location, and a geographical coordinate of said fixed location is positioned as said geolocation.

9. The object acquiring system as of claim 1, wherein said first monitoring module and said second monitoring module are application software.

10. The object acquiring system as of claim 1, wherein said low-power communication annunciator, said first low-power communication module, and said second low-power communication module are a short-range communication module compliant with a Bluetooth or a ZigBee communication protocol.

11. The object acquiring system as of claim 1, wherein said first network communication module and said second network communication module are a long-range communication module compliant with a 3G/4G or a WiFi communication protocol.

12. The object acquiring system as of claim 1, wherein said target device is manufactured in a form of a collar, a bracelet, a watch, a badge, or an ornament.

13. An object acquiring method, applied to an object acquiring system, said object acquiring system including a cloud center including an object account database, a target device provided with an ID, a host device, and a plurality of acquiring and tracking devices with geolocation acquiring, said host device and each said acquiring and tracking device communicating with said cloud center via their respective long-range communication modules, said target device establishing a communication with said host device, or said acquiring and tracking devices, via a short-range, low-power communication module, said object acquiring method comprising the steps of:

registering said object account database, according to said ID of said target device, by said host device;

setting up a state message for said target device in said object account database of said cloud center by said host device; transmitting said ID to said host device or said acquiring and tracking devices by said target device;

if said ID is received by one of said acquiring and tracking devices, logging in, according to said ID of said target device, said object account database of said cloud center to check said state message of said target device by said acquiring and tracking device; and determining, based on said state message of said target device, whether to report said geolocation and a time said ID is received, to said cloud center by said acquiring and tracking device.

14. The object acquiring method as of claim 13, wherein the step of transmitting said ID to said host device or said acquiring and tracking devices by said target device further includes the steps, to be performed by said target device, of:

searching for said host device in the neighboring area; and wherein if said host device is detected, transmitting said ID to said host device, and wherein if one of said acquiring and tracking devices is detected, transmitting said ID to said acquiring and tracking device.

15. The object acquiring method as of claim 13, wherein if said host device sets up said state message as an alert state, said host device also records an alert location of said target device in said object account database of said cloud center.

16. The object acquiring method as of claim 15, further comprising the steps, to be performed by the acquiring and tracking device receiving said ID, of:

logging in, according to said ID of said target device, said object account database of said cloud center and checking that said state message is in alert state; and comparing said geolocation with said alert location, wherein if said geolocation and said alert location are not consistent, reporting said geolocation, and/or the time said ID is received, to said cloud center.

17. The object acquiring method as of claim 13, wherein if said host device sets up said state message as a monitoring state or acquiring state, said method comprises the steps, to be performed by the acquiring and tracking device receiving said ID, of:

logging in, according to said ID of said target device, said object account database of said cloud center and checking that said target device is in monitoring or acquiring state; and voluntarily reporting said geolocation, and/or the time said ID is received, to said cloud center.

18. The object acquiring method as of claim 17, wherein said host device records a contact message in said object account database of said cloud center, and when said target device is in acquiring state, the acquiring and tracking device receiving said ID logs in said object account database of said cloud center to check said contact message for contact information.

* * * * *